(12) United States Patent
Ahituv

(10) Patent No.: US 11,927,732 B2
(45) Date of Patent: Mar. 12, 2024

(54) ZOOM LENS WITH DUAL-RAIL GUIDE SYSTEM

(71) Applicant: Ophir Optronics Solutions Ltd., Jerusalem (IL)

(72) Inventor: Nahum Ahituv, Jerusalem (IL)

(73) Assignee: OPHIR OPTRONICS SOLUTIONS LTD., Jerusalem (IL)

( * ) Notice: Subject to any disclaimer, the term of this patent is extended or adjusted under 35 U.S.C. 154(b) by 85 days.

(21) Appl. No.: 17/691,351

(22) Filed: Mar. 10, 2022

(65) Prior Publication Data

US 2023/0288681 A1 Sep. 14, 2023

(51) Int. Cl.
| G02B 15/14 | (2006.01) |
| G02B 3/04  | (2006.01) |
| G02B 7/00  | (2021.01) |
| G02B 7/10  | (2021.01) |

(52) U.S. Cl.
CPC ............ *G02B 15/142* (2019.08); *G02B 3/04* (2013.01); *G02B 7/005* (2013.01); *G02B 7/10* (2013.01)

(58) Field of Classification Search
CPC ........ G02B 15/142; G02B 3/04; G02B 7/005; G02B 7/10
See application file for complete search history.

(56) References Cited

U.S. PATENT DOCUMENTS

| 2001/0043411 | A1  | 11/2001 | Emura et al. |
| 2018/0052298 | A1* | 2/2018  | Sueoka .................... G02B 7/08 |
| 2019/0271825 | A1  | 9/2019  | Kawanabe |
| 2021/0088748 | A1  | 3/2021  | Otsuka et al. |

FOREIGN PATENT DOCUMENTS

| CN | 112241058 A   | 1/2021 |
| WO | 2020054669 A1 | 3/2020 |

OTHER PUBLICATIONS

The Written Opinion issued for PCT counterpart application PCT/IL2023/050245 dated Jun. 20, 2023 (7 pages).
The International Search Report issued for PCT counterpart application PCT/IL2023/050245 dated Jun. 20, 2023 (4 pages).

* cited by examiner

*Primary Examiner* — James C. Jones
(74) *Attorney, Agent, or Firm* — Edward Scott Trask

(57) ABSTRACT

The present application discloses a zoom lens assembly having a first static lens group and a second static lens group defining an assembly optical axis secured to a lens support. A first guide member having a first guide member axis is secured to the lens support, and a second guide member having a second guide member axis is secured to the first guide member. A first mobile carriage is slidably coupled to the first guide member and a first mobile lens cell having a first optical axis is secured to the first mobile carriage. A second mobile carriage is slidably coupled to the first guide member, with a second mobile lens cell having a second optical axis secured to the second mobile carriage. The zoom lens assembly further includes a third mobile carriage slidably coupled to the second guide member, with a third mobile lens cell having a third optical axis secured to the third mobile carriage. The first guide member axis and the second guide member axis are substantially parallel, and the first optical axis, second optical axis, and the third optical axis are substantially collinear with the assembly optical axis.

47 Claims, 12 Drawing Sheets

ZOOM LENS WITH DUAL-RAIL GUIDE SYSTEM

BACKGROUND

Zoom lenses are used for a variety of applications, such aerospace and military imaging, thermal imaging, and inspection, at a variety of wavelength ranges from UV to infrared. In some applications, especially airborne applications, size and weight of the zoom lens assembly are important design parameters. For example, for unmanned aerial vehicles, the size and weight of the zoom lenses should be minimized. Precise alignment of the optical components mounted in mobile lens cells is important to image quality. While prior art zoom lens assemblies have proven useful in the past, a number of shortcomings have been identified. For example, misalignment of guide members guiding mobile lens cells can result in degraded image quality when the lens cells are moved when changing the field of view of the zoom lens assembly. In light of the foregoing, there is an ongoing need for an improved zoom lens cell guiding mechanism.

SUMMARY

The present application discloses various embodiments of a zoom lens assembly configured with overlapping guide members for multiple lens cells, providing for high stability of the optics through the ranges of motion the lens cells undergo during operation. In one embodiment, the zoom lens assembly includes a lens support having a first end and a second end, with a first static lens group secured to the first end of the lens support and a second static lens group secured to the second end of the lens support, wherein the first static lens group and the second static lens group together define an assembly optical axis. A first guide member having a first guide member length and a first guide member axis is secured to the lens support. A first mobile carriage configured to undergo reciprocating motion along the first guide member within a first range of motion is slidably coupled to the first guide member, and a first mobile lens cell having a first optical axis is secured to the first mobile carriage. A second guide member having a second guide member length and a second guide member axis is secured to the first guide member. A third mobile carriage configured to undergo reciprocating motion along the second guide member within a third range of motion is slidably coupled to the second guide member. A third mobile lens cell having a third optical axis is secured to the third mobile carriage. The first guide member axis and the second guide member axis are substantially parallel, and at least one of the first optical axis, the second optical axis, and the third optical axis is arranged substantially collinear with the assembly optical axis, and the assembly optical axis is parallel to the first guide member axis and the second guide member axis. At least one of the first static lens group, the second static lens group, the first mobile lens cell, and the third mobile lens cell include optical elements may be selected from the group consisting of convex-convex lenses, convex-concave lenses, concave-concave lenses, plano-convex lenses, plano-concave lenses, aspherical lenses, dual aspherical lenses, freeform lenses, off-axis parabolic lenses, specially truncated lenses, telecentric lenses, doublets, triplets, filters, mirrors, prisms, gratings, diffractive optical elements, and waveplates.

In one embodiment, the first guide member axis and the second guide member axis are parallel to within less than 1 micron over the first guide member length. In another embodiment, the first guide member axis and the second guide member axis are parallel to within less than 5 microns over the first guide member length. In another embodiment, the first guide member axis and the second guide member axis are parallel to within less than 10 microns over the first guide member length. In another embodiment, the first guide member axis and the second guide member axis are parallel to within less than 50 microns over the first guide member length. In one embodiment, at least one of the first optical axis and the third optical axis are collinear with the assembly optical axis within less than 1 micron through the first range of motion. In another embodiment, at least one of the first optical axis and the third optical axis are collinear with the assembly optical axis within less than 5 microns through the first range of motion. In another embodiment, at least one of the first optical axis and the third optical axis are collinear with the assembly optical axis within less than 10 microns through the first range of motion. In another embodiment, at least one of the first optical axis and the third optical axis are collinear with the assembly optical axis within less than 50 microns through the first range of motion.

In another embodiment, the zoom lens assembly includes a second mobile carriage configured to undergo reciprocating motion along the first guide member within a second range of motion is slidably coupled to the first guide member, and a second mobile lens cell having a second optical axis is secured to the second mobile carriage. In one embodiment, the second optical axis is collinear with the assembly optical axis to within less than 1 micron through the second range of motion. In another embodiment, the second optical axis is collinear with the assembly optical axis to within less than 5 microns through the second range of motion. In another embodiment, the second optical axis is collinear with the assembly optical axis to within less than 10 microns through the second range of motion. In another embodiment, the second optical axis is collinear with the assembly optical axis to within less than 50 microns through the second range of motion.

In one embodiment, the zoom lens assembly further comprises a first actuator coupled to the lens support and the first mobile lens cell, the first actuator operative to engage and move the first mobile lens cell in reciprocating motion along the first guide member within the first range of motion. A third actuator is coupled to the lens support and the third mobile lens cell, and is operative to engage and move the third mobile lens cell in reciprocating motion along the second guide member within the third range of motion. The first and third actuators may be selected from the group consisting of servo motor actuators, linear actuators, stepper motor actuators, linear motor actuators, and piezoelectric actuators. In another embodiment, the zoom lens assembly further comprises a second actuator coupled to the lens support and the second mobile lens cell that is operative to engage and move the second mobile lens cell in reciprocating motion along the first guide member within the second range of motion. The second actuator may be selected from the group consisting of servo motor actuators, linear actuators, stepper motor actuators, linear motor actuators, and piezoelectric actuators.

In another embodiment, a linear guide apparatus is provided, with the linear guide apparatus having at least one first guide member having a first length and a first guide member axis, at least one second guide member having a second length and a second guide member axis, and a plurality of fastening members configured to secure the at least one first guide member to the at least one second guide member so that the first guide member axis and the second guide member axis are substantially parallel through the first length. A first mobile carriage is slidably coupled to the first guide member and is configured to undergo reciprocating motion along the first guide member within a first range of motion, and a third mobile carriage is slidably coupled to the second guide member and is configured to undergo reciprocating motion along the second guide member within a third range of motion. The linear guide apparatus may further comprise a second mobile carriage is slidably coupled to the first guide member and is configured to undergo reciprocating motion along the first guide member within a second range of motion.

In one embodiment, first guide member axis and the second guide member axis are parallel within 1 micron over the second guide member length. In another embodiment, the first guide member axis and the second guide member axis are parallel within less than 5 microns over the second guide member length. In another embodiment, the first guide member axis and the second guide member axis are parallel within less than 10 microns over the second guide member length. In another embodiment, the first guide member axis and the second guide member axis are parallel within less than 50 microns over the second guide member length.

In another embodiment, an optical assembly is provided, the optical assembly including at least one first guide member having a first guide member length and a first guide member axis, with a first mobile carriage slidably coupled to the at least one first guide member, the first mobile carriage configured to undergo reciprocating motion along the first guide member within a first range of motion. A first mobile lens cell having a first optical axis is secured to the first mobile carriage. The optical assembly includes at least one second guide member having a second guide member length and a second guide member axis wherein the at least one second guide member is coupled to the first guide member. A third mobile carriage configured to undergo reciprocating motion along the second guide member within a third range of motion is slidably coupled to the second guide member. A third mobile lens cell having a third optical axis is secured to the third mobile carriage, wherein the third optical axis and the first optical axis form a subassembly optical axis. The first guide member axis and the second guide member axis are substantially parallel, and the subassembly optical axis is substantially parallel to the first guide member axis and the second guide member axis.

At least one of the first static lens group, the second static lens group, the first mobile lens cell, and the third mobile lens cell include optical elements may be selected from the group consisting of convex-convex lenses, convex-concave lenses, concave-concave lenses, plano-convex lenses, plano-concave lenses, aspherical lenses, dual aspherical lenses, freeform lenses, off-axis parabolic lenses, specially truncated lenses, telecentric lenses, doublets, triplets, filters, mirrors, prisms, gratings, diffractive optical elements, and waveplates.

In another embodiment, the optical assembly further comprises a second mobile carriage slidably coupled to the first guide member, the second mobile carriage configured to undergo reciprocating motion along the first guide member within a second range of motion, a second mobile lens cell having a second optical axis is secured to the second mobile carriage, wherein second optical axis is substantially collinear with the subassembly optical axis, and is substantially parallel to the first guide member axis and the second guide member axis. The second mobile lens cell includes optical elements selected from the group consisting of convex-convex lenses, convex-concave lenses, concave-concave lenses, plano-convex lenses, plano-concave lenses, aspherical lenses, dual aspherical lenses, freeform lenses, off-axis parabolic lenses, specially truncated lenses, telecentric lenses, doublets, triplets, filters, mirrors, prisms, gratings, diffractive optical elements, and waveplates.

In one embodiment, the first guide member axis and the second guide member axis are parallel to within less than 1 micron over the first guide member length. In another embodiment, the first guide member axis and the second guide member axis are parallel to within less than 5 microns over the first guide member length. In another embodiment, the first guide member axis and the second guide member axis are parallel to within less than 10 microns over the first guide member length. In another embodiment, the first guide member axis and the second guide member axis are parallel to within less than 50 microns over the first guide member length.

In one embodiment, the subassembly optical axis is parallel to the first guide member axis within less than 1 micron over the first guide member length. In another embodiment, the subassembly optical axis is parallel to the first guide member axis to within less than 5 microns over the first guide member length. In another embodiment, the subassembly optical axis is parallel to the first guide member axis to within less than 10 microns over the first guide member length. In another embodiment, wherein the subassembly optical axis is parallel to the first guide member axis to within less than 50 microns over the first guide member length.

In one embodiment, the second optical axis is collinear with the subassembly optical axis to within less than 1 micron over the first guide member length. In another embodiment, the second optical axis is collinear with the subassembly optical axis to within less than 5 microns over the first guide member length. In another embodiment, the second optical axis is collinear with the subassembly optical axis to within less than 10 microns over the first guide member length. In another embodiment, the second optical axis is collinear with the subassembly optical axis to within less than 50 microns over the first guide member length.

In another embodiment, a guide member is provided, having a guide member body, a first guide portion formed on the guide member body, the first guide portion having a first guide portion length and a first guide portion axis. A second guide portion having a second guide portion length and a second guide portion axis is formed on the guide member body. In one embodiment, the first guide portion axis and the second guide portion axis are substantially parallel over the first guide portion length. In another embodiment, the first guide portion axis and the second guide portion axis are parallel to within less than 1 micron over the first guide portion length. In another embodiment, the first guide portion axis and the second guide portion axis are parallel to within less than 5 microns over the first guide portion length. In another embodiment, the first guide portion axis and the second guide portion axis are parallel to within less than 10 microns over the first guide portion length. In another embodiment, the first guide portion axis and the second guide portion axis are parallel to within less than 10 microns over the first guide portion length.

BRIEF DESCRIPTION OF THE DRAWINGS

Various embodiments of an improved zoom lens assembly will be explained in more detail by way of the accompanying drawings, wherein.

DETAILED DESCRIPTION

Figure 1:
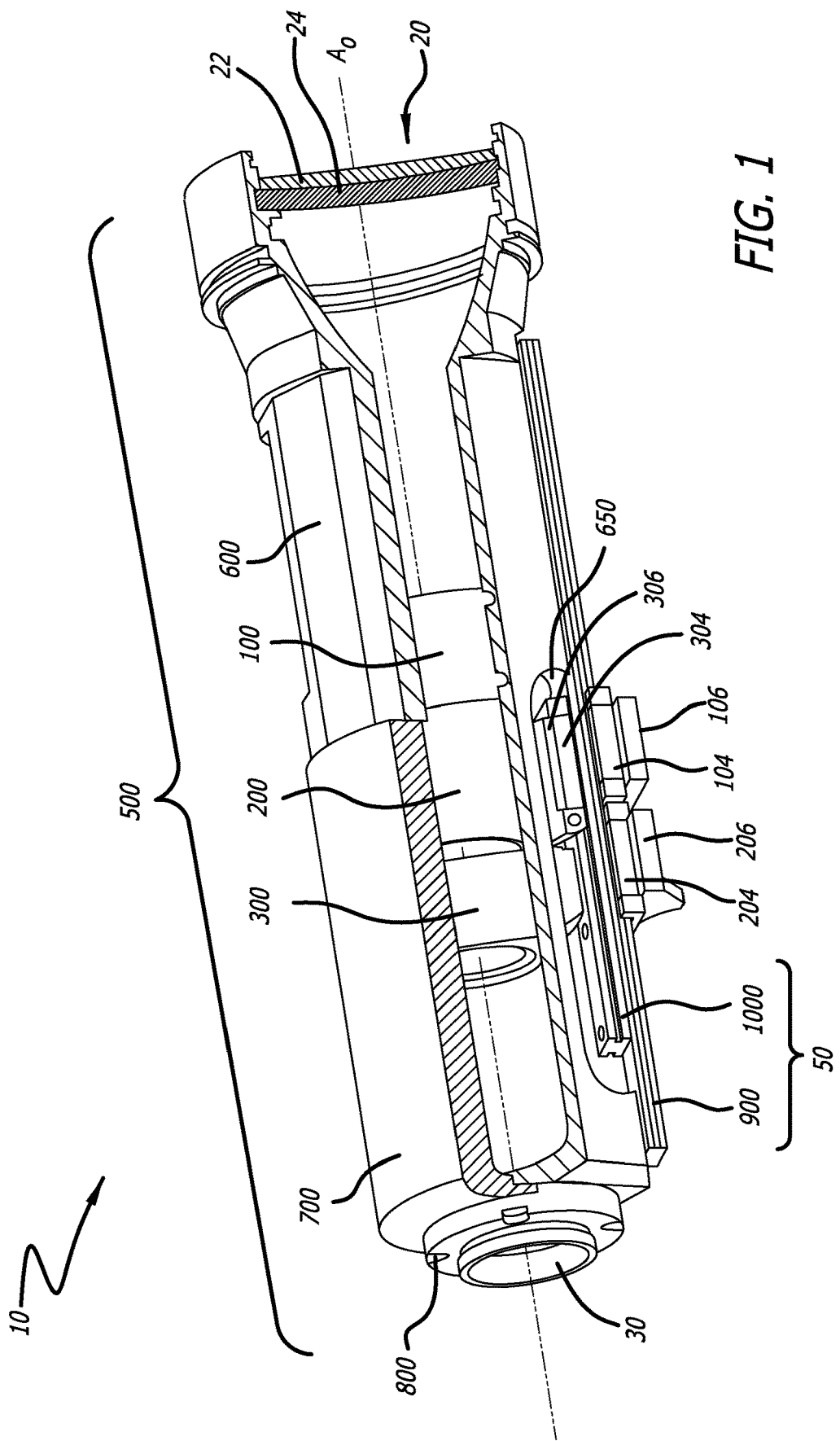
FIG. 1 shows a cutaway view of an embodiment of a zoom lens assembly with mobile lens cells positioned for narrow filed of view performance.

Example embodiments are described herein with reference to the accompanying drawings. Unless otherwise expressly stated, in the drawings the sizes, positions, etc., of components, features, elements, etc., as well as any distances therebetween, are not necessarily to scale, and may be exaggerated for clarity. In the drawings, like numbers refer to like elements throughout. Thus, the same or similar numbers may be described with reference to other drawings even if they are neither mentioned nor described in the corresponding drawing. Also, even elements that are not denoted by reference numbers may be described with reference to other drawings.

The terminology used herein is for the purpose of describing particular exemplary embodiments only and is not intended to be limiting. Unless otherwise defined, all terms (including technical and scientific terms) used herein have the same meaning as commonly understood by one of ordinary skill in the art. As used herein, the singular forms "a," "an" and "the" are intended to include the plural forms as well, unless the context clearly indicates otherwise. Also, the terms "at least one", "at least a", and "one or more" may are intended to include both the singular and plural forms, depending on the context. It should be recognized that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Unless indicated otherwise, terms such as "first," "second," etc., are only used to distinguish one element from another. For example, one coupler could be termed a "first coupler" and similarly, another coupler could be termed a "second coupler", or vice versa.

Unless indicated otherwise, spatially relative terms, such as "below," "beneath," "lower," "above," and "upper," "opposing," and the like, may be used herein for ease of description to describe one element or feature's relationship to another element or feature, as illustrated in the FIGS. It should be recognized that the spatially relative terms are intended to encompass different orientations in addition to the orientation depicted in the FIGS. For example, if an object in the FIGS. is turned over, elements described as "below" or "beneath" other elements or features would then be oriented "above" the other elements or features. Thus, the exemplary term "below" can encompass both an orientation of above and below. An object may be otherwise oriented (e.g., rotated 90 degrees or at other orientations) and the spatially relative descriptors used herein may be interpreted accordingly. A set of reference axes (e.g., X, Y, Z), directions, or coordinates, and the rotation around them (e.g., θX, θY, θZ) may be included in the FIGS. for the purpose of orienting the reader to facilitate understanding of the FIGS. and the specification, and do not necessarily indicate that any particular feature or element is aligned with, or is orthogonal to, any other feature or element.

The paragraph numbers used herein are for organizational purposes only, and, unless explicitly stated otherwise, are not to be construed as limiting the subject matter described. It will be appreciated that many different forms, embodiments and combinations are possible without deviating from the spirit and teachings of this disclosure and so this disclosure should not be construed as limited to the example embodiments set forth herein. Rather, these examples and embodiments are provided so that this disclosure will be thorough and complete, and will convey the scope of the disclosure to those skilled in the art.

Zoom lens alignment mechanisms known in the art provide separate guide members for different mobile lens cells. Collinearity of the optical axes of the lenses used in these lens cells is important to the proper operation of the zoom lens. The use of multiple guide members (e.g., located on opposing sides of the lens housing) can enable a reduction in the size of the zoom lens assembly. However, misalignment between the multiple guide members can result in misalignment of the lens cells and the optical axes of the optics mounted therein, resulting in the displacement of or defocusing of the image at the camera sensor, thereby affecting the quality of information (e.g., target images in military applications) gathered by the zoom lens. Exemplary embodiments of an improved zoom lens with multiple guide members are disclosed herein.

The exemplary embodiments described below relate to optical elements that are provided as lenses, lens groups, lens cells, lens assemblies, or other types of optical components. These optical elements may be provided as any variety of lens types including without limitation, convex-convex, convex-concave, concave-concave, plano-convex, plano-concave, aspherical, dual aspherical, freeform, off-axis parabolic lenses, specially truncated lenses, telecentric lenses, doublets, triplets, and the like or any combination thereof. Exemplary lens materials include, without limitation, fused silica, BK7, Germanium, Silicon, Zinc Selenide, Zinc Sulfide, Calcium Fluoride, and chalcogenide (such as AMTIR/IG materials) and the like. Lens materials may be chosen for, or tailored to, wavelength ranges or spectral ranges such as UV, visible, NIR (near-infrared), SWIR (short wavelength infrared), MWIR (medium wavelength infrared), and LWIR (long wavelength infrared). The lenses and optical elements may include coatings such as anti-reflective, multi-spectral, DLC (diamond-like carbon), and EUV (extreme UV) coatings. Other optical elements may be included, such as filters, mirrors, prisms, gratings, diffractive optical elements (DOEs), waveplates, and the like. The lenses and optical elements may be secured in lens housings or lens bodies made from any variety of materials, including, without limitation, aluminum, corrosion resistant ("stainless") steels, Kovar, Invar, Zerodur, and the like or any combination thereof. The lens groups, lens cells and the overall zoom lens assembly may be selected, designed, or configured to maximize optothermal stability, also referred to as "athermal" or "athermalized" designs. Those skilled in the art will appreciate that any variety of optical elements, lenses, optical materials, optical coatings, or lens cell body materials may be used in the embodiments of a zoom lens assembly described herein.

Figure 2:
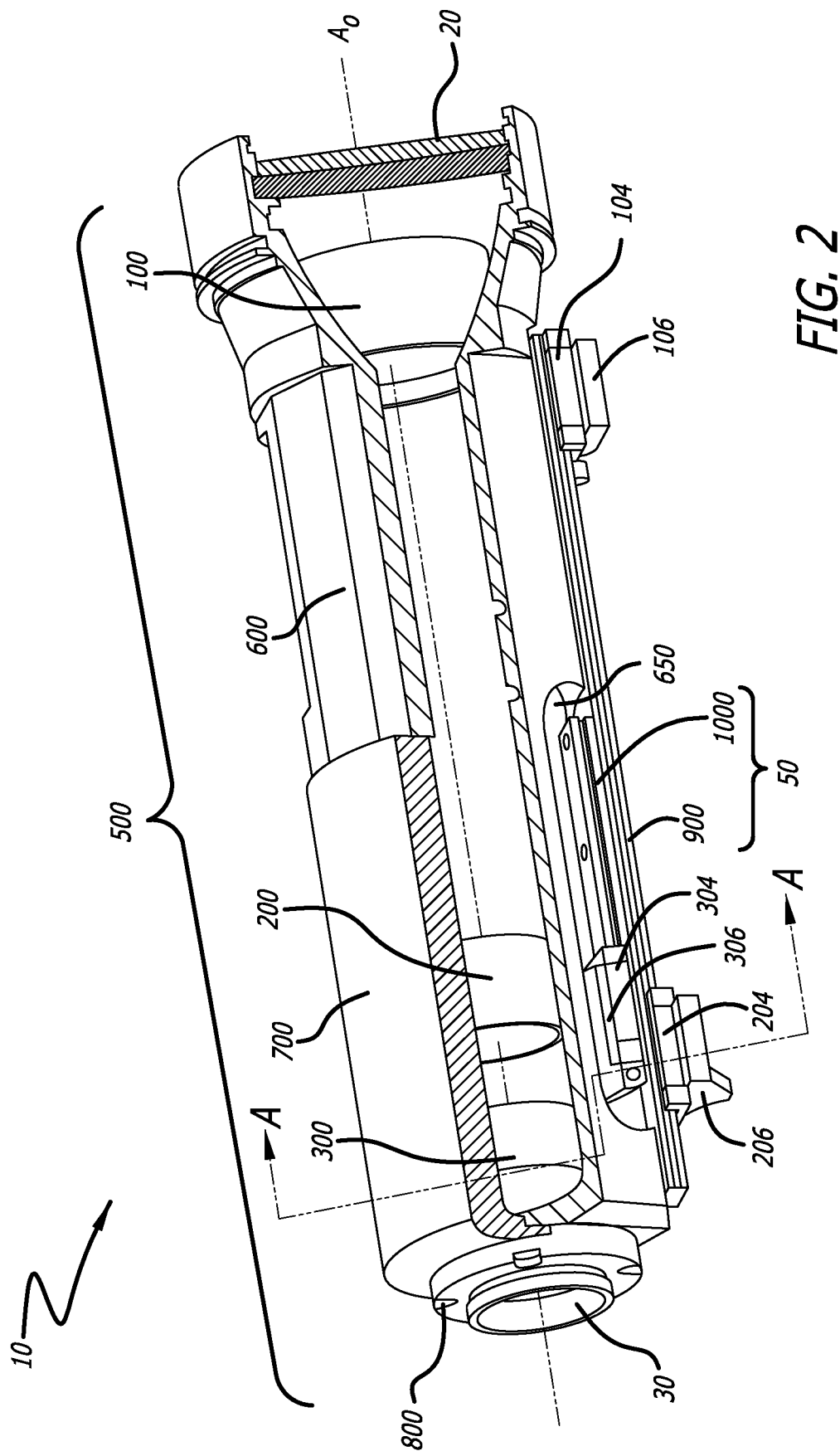
FIG. 2 shows a cutaway view of the embodiment of a zoom lens assembly shown in FIG. 1 with mobile lens cells positioned for wide filed-of-view performance.

FIGS. 1 and 2 show cutaway views of positional states of an exemplary embodiment of a zoom lens assembly 10. In the illustrated embodiment, the zoom lens assembly 10 includes a lens support 500, comprising a first lens support body 600, second lens support body 700, and third lens support body 800 (also referred to herein as the "support bodies 600, 700 and 800"). Alternatively, the lens support 500 may be provided as a single body. The support body 600 includes a support body slot 650 formed therein. In this embodiment, the zoom lens assembly 10 includes a first static lens group 20 secured to a first end of the lens support 500, and a second static lens group 30 secured to a second end of the lens support 500. The first static lens group 20 and the second static lens group 30 define an assembly optical axis $A_0$. In this embodiment, the first static lens group 20 includes a first optical component 22, provided as a convex-convex lens, and a second optical component 24, provided as a plano-concave lens. Though not shown, the second static lens group 30 also includes a convex-convex lens and a plano-concave lens. Those skilled in the art will appreciate that the first static lens group 20 and the second static lens group 30 may include any number, type, or variety of optical components.

For the purposes of defining the alignment of the various axes described herein, two, three, or more axes are considered "parallel" to each other if a distance between the respective axes (in the X, Y, or Z directions) is constant along a defined length or range of motion. Two, three, or more axes are considered "collinear" if the respective axes overlap along a defined length or range of motion. Parallelism and collinearity may be expressed in microns or degrees. The term "alignment error" used herein (and described in more detail with respect to FIG. 8), may refer to two or more axes being out-of-parallel or non-collinear, depending on the context. For example, "parallel to within less than 5 microns over the first guide member length" means that the alignment error between two axes (e.g., two guide member axes) over the length of the first guide member is less than 5 microns. Also for example, "collinear within less than 5 microns over the first range of motion" means that the alignment error between two axes (e.g., two optical axes) over a defined first range of motion is less than 5 microns.

As shown in FIGS. 1 and 2, in the illustrated embodiment, the zoom lens assembly 10 includes a first mobile lens cell 100, a second mobile lens cell 200, and a third mobile lens cell 300 positioned within an interior volume of the lens support 500, each mobile lens cell is configured to undergo reciprocating motion within a range of motion along the assembly optical axis $A_0$, relative to each other, and relative to the first static lens group 20 and the second static lens group 30. In this embodiment, the first static lens group 20 performs magnification, the first mobile lens cell 100 and the second mobile lens cell 200 perform zoom functions, the third mobile lens cell 300 performs a focus function, and the second static lens group 30 relays an optical image to an optical sensor (not shown). FIG. 1 shows the mobile lens cells 100, 200, and 300 positioned for narrow field-of-view (FOV) performance, and FIG. 2 shows the mobile lens cells 100, 200, and 300 positioned for wide FOV performance. Those skilled in the art will appreciate the zoom lens assembly 10 may include any number of static lens groups or mobile lens cells arranged in any orientation relative to each other, and configured to perform any variety or combination of optical functions. During operation of the zoom lens assembly 10, optimal performance depends on the optical axes of the mobile lens cells 100, 200, and 300 being substantially collinear with the assembly optical axis $A_0$ through their entire range of motion (i.e., from their respective positions in the narrow FOV position to their respective positions in the wide FOV position). FIG. 1 shows each mobile lens cell at the first end of its range of motion, and FIG. 2 shows each mobile lens cell at the second end of its range of motion.

To provide collinearity of optical axes of the lens cells through their respective ranges of motion, a linear guide assembly 50 configured to guide the mobile lens cells 100, 200, and 300 through their respective ranges of motion is secured to the lens support 500. In this embodiment, the linear guide assembly 50 includes a first guide member 900 having a first guide member length, a second guide member 1000 having a second guide member length, a first mobile carriage 104, a second mobile carriage 204, and a third mobile carriage 304. The mobile lens cells 100, 200, and 300 include attachment members 106, 206 and 306, respectively, configured to secure the mobile lens cells to mobile carriages 104, 204, and 304, respectively, so that the optical axes $A_1$, $A_2$, and $A_3$ are collinear with the assembly optical axis $A_0$ through their respective ranges of motion. The first mobile carriage 104 is slidably coupled to, and is configured to undergo reciprocating motion along, the first guide member 900 through a first range of motion when engaged by a first actuator 150 (described below with respect to FIG. 11). The second mobile carriage 204 is slidably coupled to, and is configured to undergo reciprocating motion along, the first guide member 900 through a second range of motion when engaged by a second actuator 250 (described below with respect to FIG. 11). The third mobile carriage 304 is slidably coupled to, and is configured to undergo reciprocating motion along, the second guide member 1000 through a third range of motion when engaged by a third actuator 350 (described below with respect to FIG. 11). The attachment members 106, 206 and 306 extend from the respective lens cell bodies (described below) within the interior volume of the lens support 500 and through the support body slot 650, to an exterior volume of the lens support 500, where they are attached to the respective mobile carriages. Each attachment member 106, 206, 306 is configured to enable its corresponding mobile lens cell to be positioned immediately adjacent to each other (as will be described in detail with respect to FIGS. 7, 9 and 10 below) in the narrow FOV configuration shown in FIG. 1 in order to minimize the overall size and weight of the zoom lens assembly 10. The attachment members 106, 206 and 306 may each include a single component or multiple components, as required to secure the mobile lens cells 100, 200 and 300 to their respective mobile carriages. The linear guide assembly 50 may be positioned within or outside the interior volume of the lens support 500. Optionally, at least some portion of the first guide member 900 may be positioned in the exterior volume and at least some portion of the second guide member 1000 may be positioned within the interior volume of the lens support 500.

Figure 3:
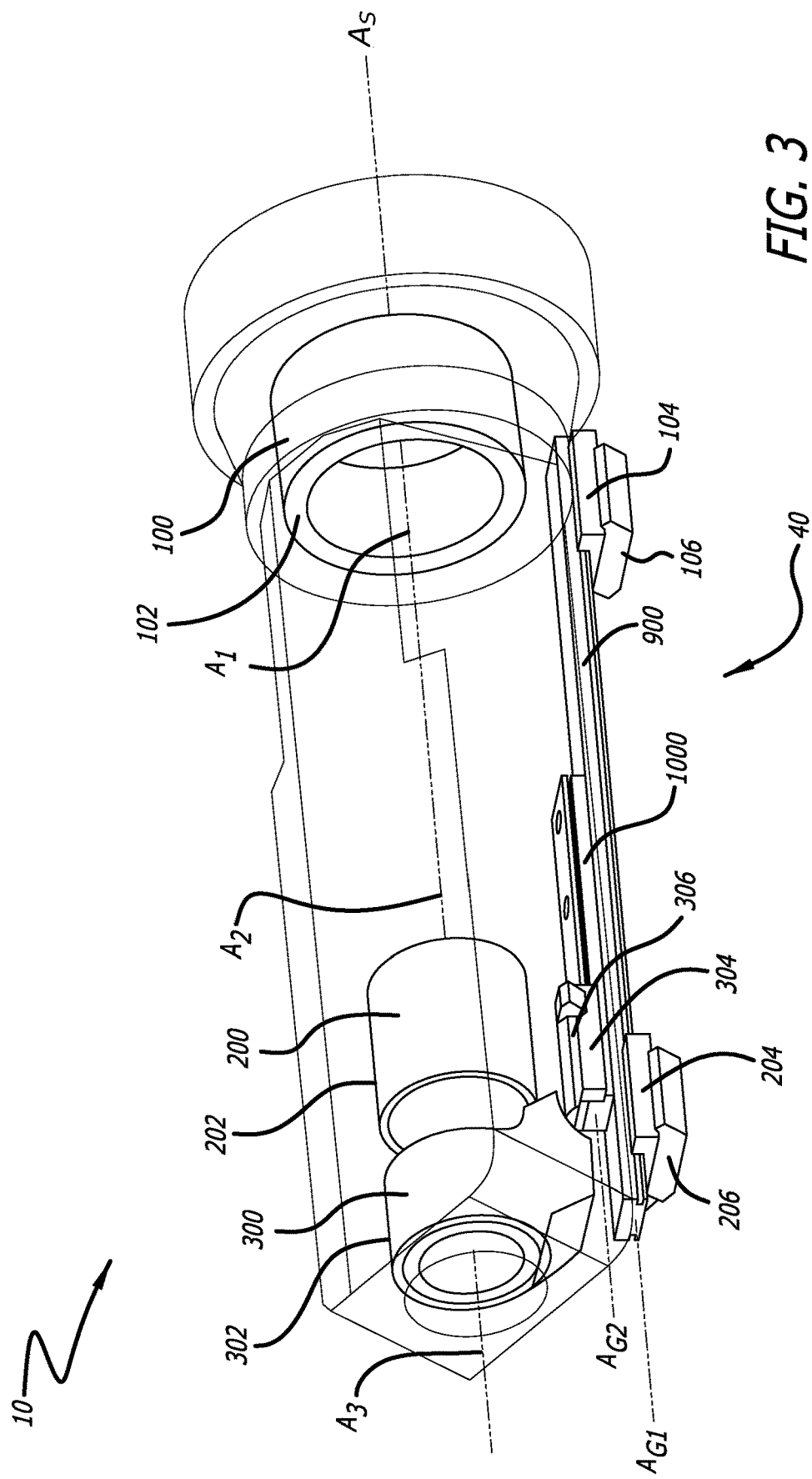
FIG. 3 shows a translucent perspective view of the embodiment of the zoom lens assembly shown in FIG. 2.

FIG. 3 shows a perspective view of the embodiment of the zoom lens assembly 10 shown in FIGS. 1 and 2, wherein the lens support 500 is shown as translucent in order to show the relative positions of the lens cells. In this embodiment, the lens cells 100, 200, and 300 are part of an optical assembly 40 having a subassembly optical axis $A_S$. The optical assembly 40 includes a first guide member 900 having a first guide member axis $A_{G1}$ and a second guide member 1000 having a second guide member axis $A_{G2}$. In this embodiment of the optical assembly 40, the first guide member 900, the first guide member axis $A_{G1}$, the second guide member 1000, and the second guide member axis $A_{G2}$ are oriented and defined in the same way as the linear guide assembly 50 as described below with respect to FIGS. 4 and 5. The optical assembly 40 further includes a first mobile lens cell 100, a second mobile lens cell 200 and a third mobile lens cell 300 positioned within the interior volume of the lens support 500. The first mobile lens cell 100 includes a first mobile lens cell body 102 configured to accept one or more optical components (not shown) within, and at least one attachment member 106 configured to secure the second mobile lens cell body 102 to a mobile carriage 104. The optical components positioned in the first mobile lens cell body 102 define an optical axis $A_1$. The second mobile lens cell 200 includes a second mobile lens cell body 202 configured to accept one or more optical components (not shown) within, and at least one attachment member 206 configured to secure the second mobile lens cell body 202 to a mobile carriage 204. The optical components positioned in the second mobile lens cell body 202 define an optical axis $A_2$. The third mobile lens cell 300 includes a third mobile lens cell body 302 configured to accept one or more optical components (not shown) within, and at least one attachment member 306 configured to secure the third mobile lens cell body 302 to a mobile carriage 304. The optical components positioned in the third mobile lens cell body 302 define an optical axis $A_3$. The first mobile carriage 104 and the second mobile carriage 204 are slidably coupled to the first guide member 900 and are configured to undergo reciprocating motion along the first guide member 900 within a first range of motion and a second range of motion, respectively. The third mobile carriage 304 is slidably coupled to the second guide member 1000 and is configured to undergo reciprocating motion along the second guide member 1000 through a third range of motion. In the illustrated embodiment, the first guide member axis $A_{G1}$ and the second guide member axis $A_{G2}$ are positioned substantially parallel to each other along their respective lengths. By virtue of the first guide member axis $A_{G1}$ and the second guide member axis $A_{G2}$ being positioned substantially parallel to each other, the first optical axis $A_1$, the second optical axis $A_2$, and the third optical axis $A_3$ are positioned substantially collinear with each other and with the subassembly optical axis $A_S$. Alignment errors between the guide member axis $A_{G1}$ and the guide member axis $A_{G2}$ (as discussed in more detail below with respect to FIG. 8) may be measured in microns or by degrees or radians of a misalignment angle θ. In some embodiments, the optical assembly 40 may not include a second mobile lens cell 200. In other embodiments, the optical assembly 40 may include static lens cells and/or mobile lens cells arranged on either side (i.e., above and below) of the first guide member 900 or the second guide member 1000, with a turn mirror or other optic configured to direct light from static lens groups or mobile lens cells positioned above the first guide member 900 and second guide member 1000 to the static lens groups or mobile lens cells positioned below the first guide member 900 and second guide member 1000. In still other embodiments, the optical assembly 40 may include static lens groups or mobile lens cells arrayed at any angle around the first guide member axis $A_{G1}$ or the second guide member axis $A_{G2}$.

Figure 4:
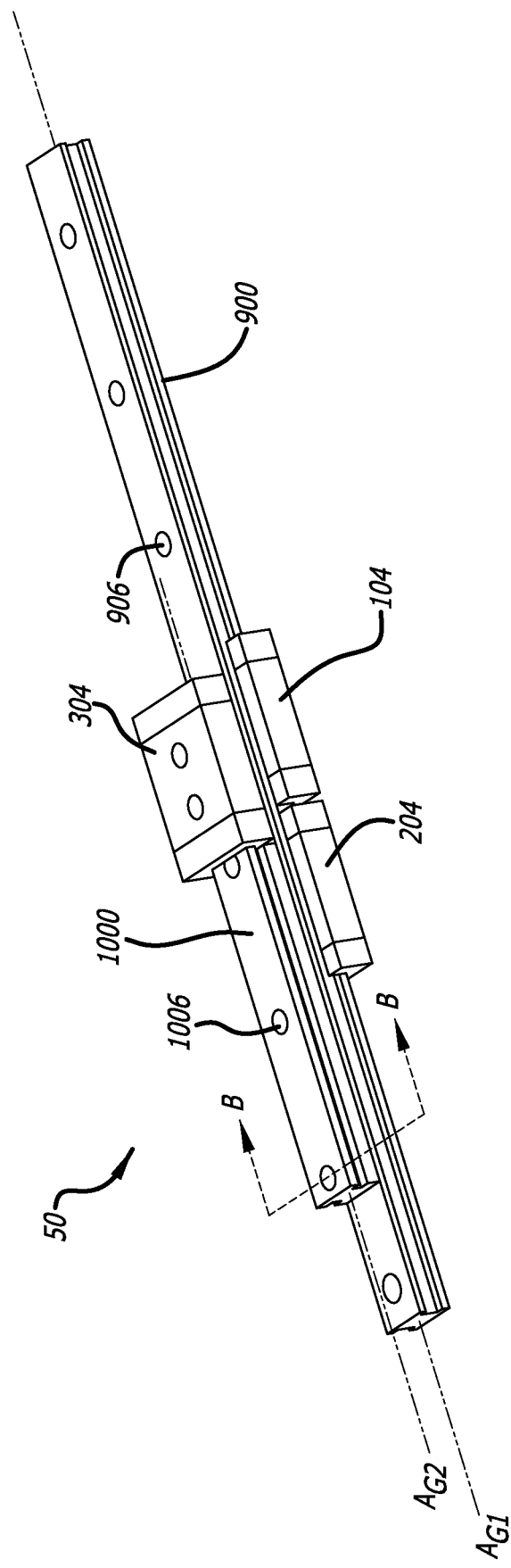
FIG. 4 shows a perspective view of an embodiment of a linear guide assembly.

FIG. 4 shows a perspective view of the embodiment of the linear guide assembly 50 shown in FIGS. 1 and 2. The linear guide assembly 50 is configured to guide the mobile lens cells 100, 200, and 300 along the assembly optical axis $A_O$ of the zoom lens assembly 10. In this embodiment, the linear guide assembly 50 includes a first guide member 900 having a first guide member axis $A_{G1}$ and a second guide member 1000 having a second guide member axis $A_{G2}$. The first guide member 900 and the second guide member 1000 include a plurality of fastener passages 906 and threaded fastener passages 1006 formed respectively therein, with the fastener passages 906, 1006 configured to accept a plurality of fastening members 908 (shown in FIG. 5) therein, to secure the first guide member 900 to the second guide member 1000. A first mobile carriage 104 and a second mobile carriage 204 are slidably coupled to the first guide member 900, and a third mobile lens cell 300 is slidably coupled to the second guide member 1000.

Figure 5:
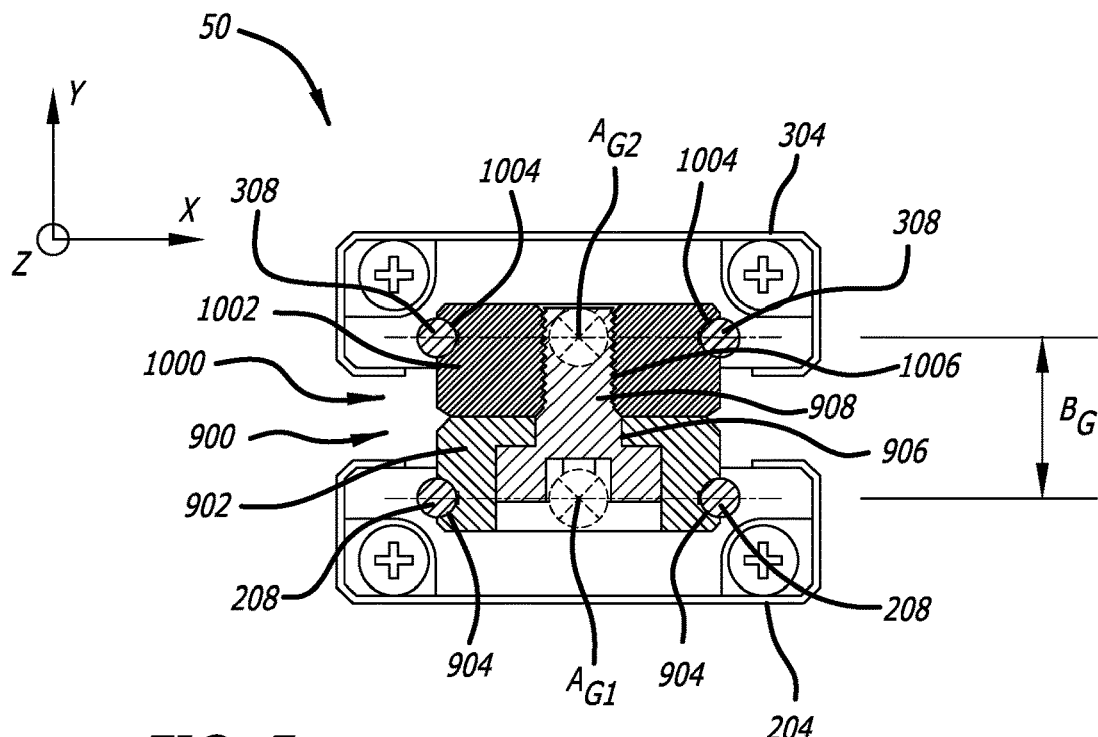
FIG. 5 shows a cross-sectional view of the embodiment of a linear guide assembly shown in FIG. 4.

FIG. 5 shows a section B-B view of the linear guide assembly 50 shown in FIG. 4. A set of Cartesian coordinates X, Y, and Z is shown to orient the section view for the purpose of this description. The first guide member 900 includes a first guide member body 902 having a pair of bearing races 904 formed therein, with the bearing races 904 configured to accept bearings 208 of the second mobile carriage 204. The bearing races 904 are also configured to accept bearings 108 of the first mobile carriage 104, though neither the bearings 108 or the first mobile carriage 104 are shown in this view. In this embodiment, the bearing races 904 define the first guide member axis $A_{G1}$, located equidistant from each bearing race 904, and extending in the Z direction. The second guide member 1000 includes a second guide member body 1002 having a pair of bearing races 1004 formed therein, with the bearing races 1004 configured to accept bearings 308 of the third mobile carriage 304. In this embodiment, the bearing races 1004 define the second guide member axis $A_{G2}$, located equidistant from each bearing race 1004, and extending in the Z direction. The first guide member axis $A_{G1}$ and the second guide member axis $A_{G2}$ are offset from each other in the Y direction by a guide member offset $B_G$. A variation in the guide member offset $B_G$ along the length of the first or second guide members 900, 1000 would result in a guide axis alignment error $E_G$ (described in more detail below with respect to FIG. 8). To ensure that the guide axis alignment error $E_G$ is within acceptable tolerances in both the X and Y directions, the first guide member 900 and second guide member 1000 may be held in an alignment fixture (not shown) operative to align the bearing races 904 and the bearing races 1004 (e.g., thereby aligning the first guide member axis $A_{G1}$ and the second guide member axis $A_{G2}$ parallel to each other), before the plurality of fastening members 908 are tightened (e.g., by a torque wrench or other tool configured to apply sufficient and repeatable torque) to secure the second guide member 1000 to the first guide member 900 so that the axes $A_{G1}$ and $A_{G2}$ remain parallel during operation of the zoom lens assembly 10. In one embodiment, the first guide member axis $A_{G1}$ and the second guide member axis $A_{G2}$ are parallel to within less than 1 micron (i.e., having a guide axis alignment error $E_G$ of less than 1 micron). In another embodiment, the first guide member axis $A_{G1}$ and the second guide member axis $A_{G2}$ are parallel to within less than 5 microns (i.e., having a guide axis alignment error $E_G$ of less than 5 microns). In another embodiment, the first guide member axis $A_{G1}$ and the second guide member axis $A_{G2}$ are parallel to within less than 10 microns (i.e., having a guide axis alignment error $E_G$ of less than 10 microns). In another embodiment, the first guide member axis $A_{G1}$ and the second guide member axis $A_{G2}$ are parallel to within less than 50 microns (i.e., having a guide axis alignment error $E_G$ of less than 50 microns). Those skilled in the art will appreciate that the first guide member axis $A_{G1}$ and the second guide member axis $A_{G2}$ are parallel to within 50 microns or more (i.e., having a guide axis alignment error $E_G$ equal to or greater than 50 microns). By virtue of the first guide member axis $A_{G1}$ and the second guide member axis $A_{G2}$ being parallel to each other within these tolerances, the assembly optical axis $A_0$, the optical axis $A_1$, the optical axis $A_2$, and the optical axis $A_3$ may be collinear to within the same tolerances. In the illustrated embodiment, the bearings 208 and 308 are provided as spherical bearings, with appropriate bearing races formed in the guide members 900 and 1000. In another embodiment, the bearings 208 and 308 may be provided as cylindrical bearings in a cross-roller bearing configuration, with appropriate bearing races formed in the guide members 900 and 1000. In the illustrated embodiment, the bearing races are flat surfaces oriented orthogonal to each other configured to interface with the spherical bearings 208 and 308. In another embodiment, the bearing races may have a "gothic arch" configuration configured to interface with spherical bearings. Those skilled in the art will appreciate that the bearing races and bearings may be provided in any manner or configuration.

Figure 6:
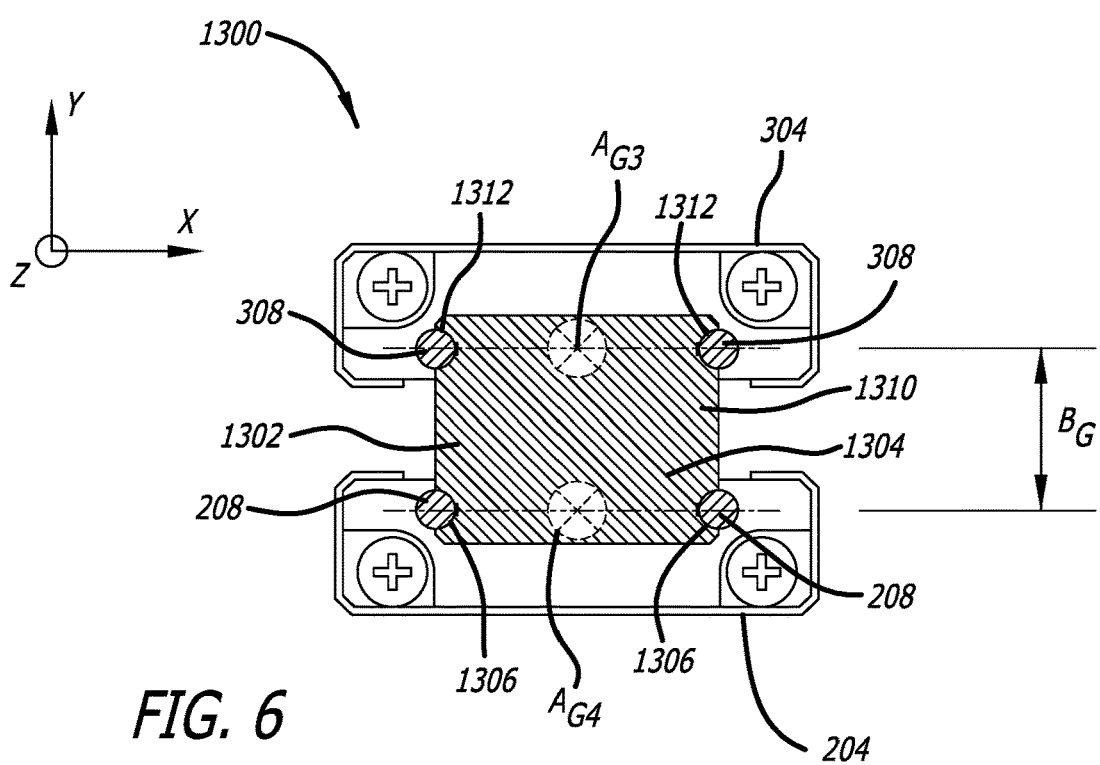
FIG. 6 shows a cross-sectional view of an alternative embodiment of a linear guide assembly.

FIG. 6 shows a cross-section view of an embodiment of a linear guide assembly 1300. The linear guide assembly 1300 is similar to the linear guide assembly 50, but instead of having separate guide members 900 and 1000, the linear guide assembly 1300 has a monolithic guide member body 1302 having a first guide portion 1304 and a second guide portion 1310 formed therein. In this embodiment, the first guide portion 1304 has a first guide portion length substantially equal to the length of the first guide member 900 shown in FIG. 4, and the second guide portion 1310 has a second guide portion length substantially equal to the length of the second guide member 1000 shown in FIG. 4. Also, the ends of the first guide portion 1304 and the second guide portion 1310 are oriented to each other the same way as the first guide member 900 and the second guide member 1000 as shown in FIG. 4. Referring back to FIG. 6, the first mobile carriage 104 (positioned behind mobile carriage 204) and the second mobile carriage 204 are configured to undergo reciprocating motion along the first guide portion 1304 through a first range of motion and second range of motion, respectively. The third mobile carriage 304 is configured to undergo reciprocating motion along the second guide portion 1310 through a third range of motion. A pair of bearing races 1306 is formed in the first guide portion 1304 and a pair of bearing races 1312 is formed in the second guide portion 1310. The pair of bearing races 1306 defines a first guide portion axis $A_{G4}$ located equidistant from each bearing race 1306 and the pair of bearing races 1312 defines a second guide portion axis $A_{G3}$ located equidistant from each bearing race 1312. The second guide portion axis $A_{G3}$ and the first guide portion axis $A_{G4}$ are offset in the Y direction by a guide portion offset $B_G$. The bearing races 1306 are configured to accept bearings 208 of the second mobile carriage 204. The bearing races 1306 are also configured to accept the bearings 108 of the first mobile carriage 104, though neither the bearings 108 or the first mobile carriage 104 are shown in this view. The pair of bearing races 1312 are configured to accept bearings 308 of the third mobile carriage 304, as described above with respect to FIG. 5. Because the guide member body 1302 is formed from a single piece of material, the second guide portion axis $A_{G3}$ and the first guide portion axis $A_{G4}$ can be made parallel to machining tolerances, therefore not requiring the fixturing/alignment or fasteners used with the discrete guide members 900 and 1000.

In the illustrated embodiment, the second guide portion axis $A_{G3}$ and the first guide portion axis $A_{G4}$ are positioned substantially parallel to each other along their respective lengths. In an embodiment of the zoom lens assembly 10 where the linear guide assembly 1300 is used, by virtue of the second guide portion axis $A_{G3}$ and the first guide portion axis $A_{G4}$ being positioned substantially parallel to each other, the optical axis $A_1$, the optical axis $A_2$, and the optical axis $A_3$ are positioned substantially collinear to each other and to the assembly optical axis $A_0$. Parallelism between the second guide portion axis $A_{G3}$ and the first guide portion axis $A_{G4}$ may be measured in microns or by radians of a misalignment angle $\theta$ (as described below with respect to FIG. 8). In one embodiment, the second guide portion axis $A_{G3}$ and the first guide portion axis $A_{G4}$ are parallel to within less than 1 micron. In another embodiment, the second guide portion axis $A_{G3}$ and the first guide portion axis $A_{G4}$ are parallel to within less than 5 microns. In yet another embodiment, the second guide portion axis $A_{G3}$ and the first guide portion axis $A_{G4}$ are parallel to within less than 10 microns. In yet another embodiment, the second guide portion axis $A_{G3}$ and the first guide portion axis $A_{G4}$ are parallel to within less than 50 microns. In yet another embodiment, the second guide portion axis $A_{G3}$ and the first guide portion axis $A_{G4}$ are parallel to within 50 microns or more. By virtue of the second guide portion axis $A_{G3}$ and the first guide portion axis $A_{G4}$ being parallel to each other within these tolerances, the assembly optical axis $A_0$, the optical axis $A_1$, the optical axis $A_2$, and the optical axis $A_3$ may be collinear to within the same tolerances.

Figure 7:
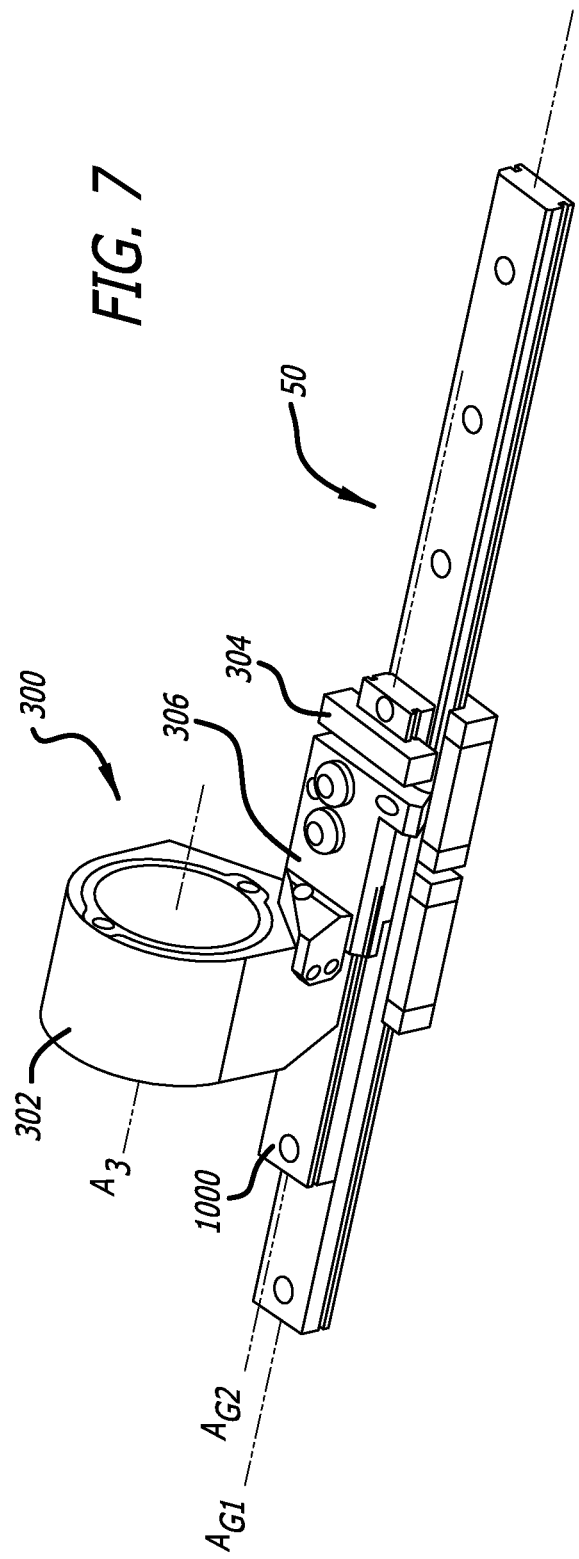
FIG. 7 shows a reverse perspective view of the embodiment of a mobile lens cell connected to the linear guide assembly shown in FIG. 4.

FIG. 7 shows a perspective view of the linear guide assembly 50 with the third mobile lens cell 300. As shown, the third mobile lens cell 300 includes a third mobile lens cell body 302 secured to the third mobile carriage 304 by at least one attachment member 306 so that the optical axis $A_3$ is parallel to both the guide member axis $A_{G2}$ and guide member axis $A_{G1}$. The third mobile lens cell 300 may include any number, type, or combination of optical elements described above. In this view, the third mobile carriage 304 is positioned at the second end of its range of motion along the second guide member 1000. The attachment member 306 may be provided as a single component or multiple components. In this embodiment, the attachment member 306 is configured to place the third mobile lens cell body 302 offset from the center of the third mobile carriage 304 along the guide member axis $A_{G2}$, so that the optical axis $A_3$ is collinear with the assembly optical axis $A_0$, the optical axis $A_1$, and the optical axis $A_2$. This enables the lens cell 300 to be located very close to the second lens cell 200 when in the narrow FOV configuration (as shown in FIG. 1), enabling the compactness of the zoom lens assembly 10.

Figure 8:
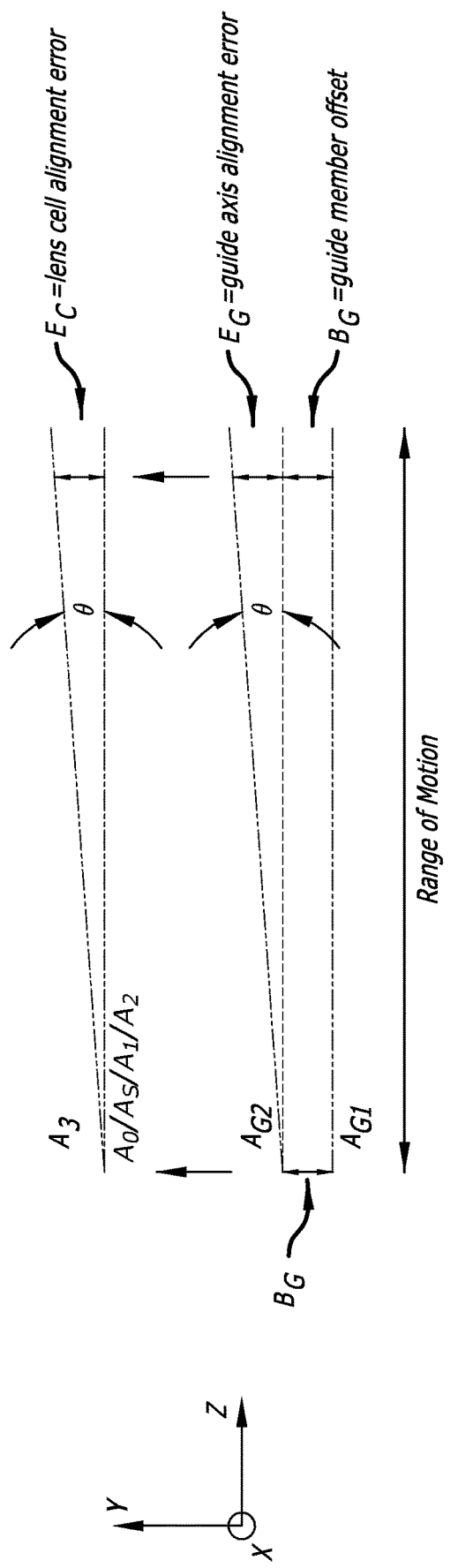
FIG. 8 shows a schematic view of the effect of misalignments of guide member axes and optical axes of the mobile lens cells of the zoom lens assembly shown in FIGS. 1 and 2.

FIG. 8 shows a schematic for describing how an error in the alignment of the first guide member axis $A_{G1}$ to the second guide member axis $A_{G2}$ can affect the collinearity of the optical axis $A_3$ to optical axes $A_0$, $A_S$, $A_1$ and $A_2$. For the sake of the discussion below, we shall assume that the axis $A_{G1}$ and the axis $A_{G2}$ are separated by the guide member offset $B_G$ (as shown in FIG. 5) at the first end of a range of motion. If the axis $A_{G1}$ and the axis $A_{G2}$ are not parallel at the second end of the range of motion, the distance between $A_{G1}$ and $A_{G2}$ may have increased by an amount $E_G$ (also referred to herein as the "guide axis alignment error $E_G$"). Assuming the first guide member 900 is properly aligned to the lens support 500, and the attachment member 106 and the attachment member 206 are designed properly, and the first mobile lens cell 100 and the second mobile lens cell 200 are properly aligned to the assembly optical axis $A_0$ or the subassembly optical axis $A_S$ because the first mobile lens cell 100 (having the optical axis $A_1$) and the second mobile lens cell 200 (having an optical axis $A_2$) travel along the first guide member 900, the optical axis $A_1$ and the optical axis $A_2$ will remain collinear with the assembly optical axis $A_0$ through their respective ranges of motion. However, because the third mobile lens cell 300 travels along a separate guide member (the second guide member 1000), and assuming that $A_3$ and $A_0$ or $A_S$ overlap at the first end of the second guide member 1000, any guide axis alignment error $E_G$ would result in a collinearity error (also referred to herein as an "optical collinearity error $E_C$") between the optical axis $A_3$ and the assembly optical axis $A_0$, the subassembly optical axis $A_S$, the optical axis $A_1$, and/or the optical axis $A_2$. The guide axis alignment error $E_G$ may exist in the X or Y directions, or both, resulting in optical collinearity errors $E_C$ in the same direction, or both. The guide axis alignment error $E_G$ and the optical axis alignment error $E_C$ may be expressed in microns, or in degrees or radians of an angle θ.

Figure 9:
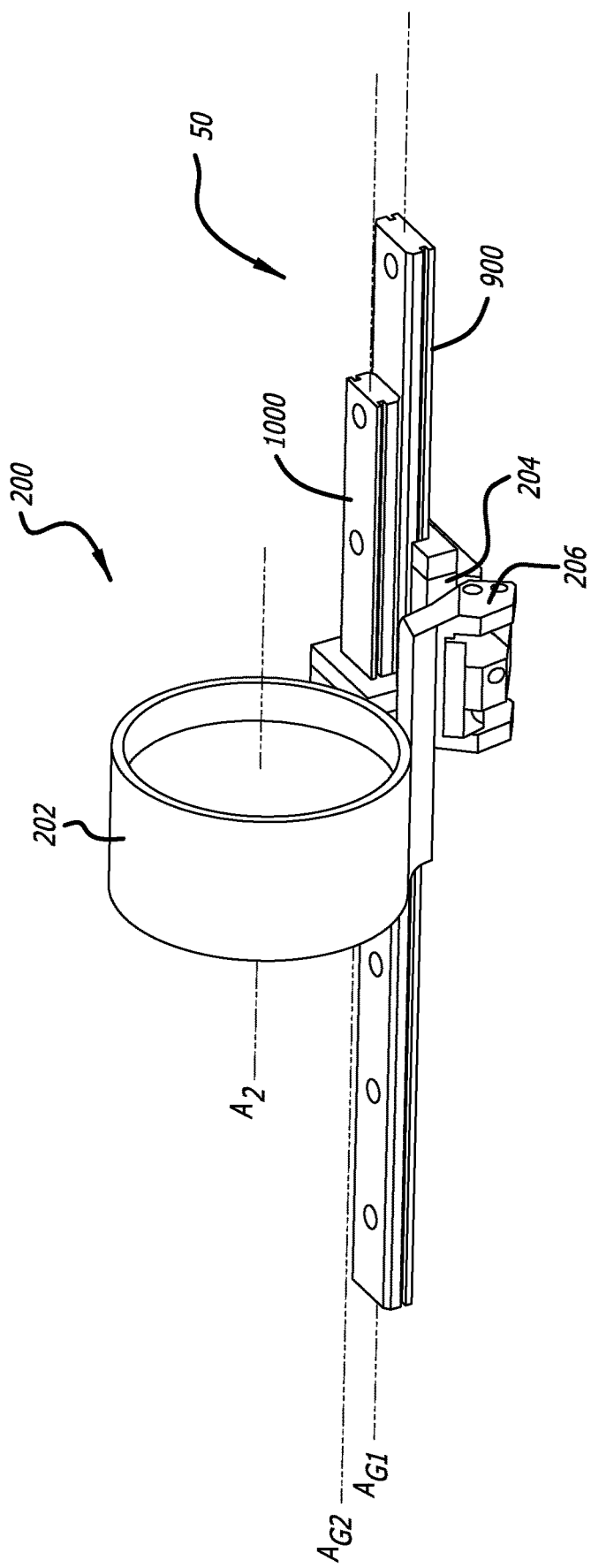
FIG. 9 shows a reverse perspective view of the embodiment of a mobile lens cell connected to the linear guide assembly shown in FIG. 4.

FIG. 9 shows a reverse perspective view of the linear guide assembly 50 with the second mobile lens cell 200. As shown, the second mobile lens cell 200 includes the second mobile lens cell body 202 secured to the second mobile carriage 204 by at least one attachment member 206 so that the optical axis $A_2$ is parallel to the guide member axis $A_{G1}$ and the guide member axis $A_{G2}$. The second mobile lens cell 200 may include any number, type, or combination of optical elements described above. In this view, the second mobile carriage 204 is positioned at the second end of its range of motion along the first guide member 900. The attachment member 206 may be provided as a single component or multiple components. The attachment member 206 is configured to wrap around underneath the first guide member 900, where it is secured to the second mobile carriage 204. In this embodiment, the attachment member 206 is configured to place the second mobile lens cell body 202 offset from the center of the second mobile carriage 204 in the direction along the guide member axis $A_{G1}$ so that the optical axis $A_2$ is collinear with the assembly optical axis $A_0$, the optical axis $A_1$, and the optical axis $A_3$. This enables the lens cell 200 to be located adjacent to the third mobile lens cell 300 when in the narrow FOV configuration (as shown in FIG. 1), enabling the compactness of the zoom lens assembly 10.

Figure 10:
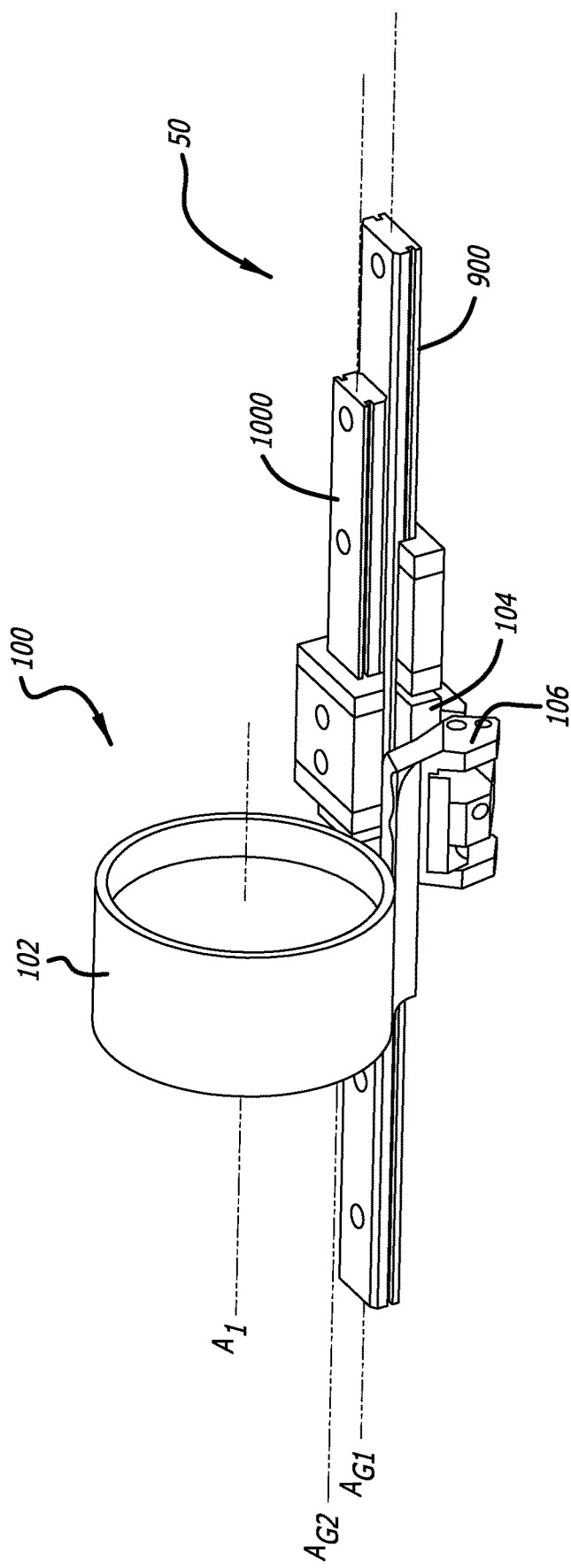
FIG. 10 shows a reverse perspective view of the embodiment of a mobile lens cell connected to the linear guide assembly shown in FIG. 4.

FIG. 10 shows a reverse perspective view of the linear guide assembly 50 with the first mobile lens cell 100. As shown, the first mobile lens cell 100 includes a first mobile lens cell body 102 secured to the first mobile carriage 104 by at least one attachment member 106 so that the optical axis $A_1$ is parallel to the guide member axis $A_{G1}$ and the guide member axis $A_{G2}$. The first mobile lens cell 100 may include any number, type, or combination of optical elements described above. In this view, the first mobile carriage 104 is positioned at the second end of its range of motion along the first guide member 900. The attachment member 106 may be provided as a single component or multiple components. The attachment member 106 is configured to wrap around underneath the first guide member 900, where it is secured to the first mobile carriage 104. In this embodiment, the attachment member 106 is configured to place the first mobile lens cell body 102 offset from the center of the first mobile carriage 104 in the direction along the guide member axis $A_{G1}$ so that the optical axis $A_1$ is collinear with the assembly optical axis $A_0$, the optical axis $A_2$, and the optical axis $A_3$. This enables the lens cell 100 to be located adjacent to the second mobile lens cell 200 when in the narrow FOV configuration (as shown in FIG. 1), enabling the compactness of the zoom lens assembly 10.

Figure 11:
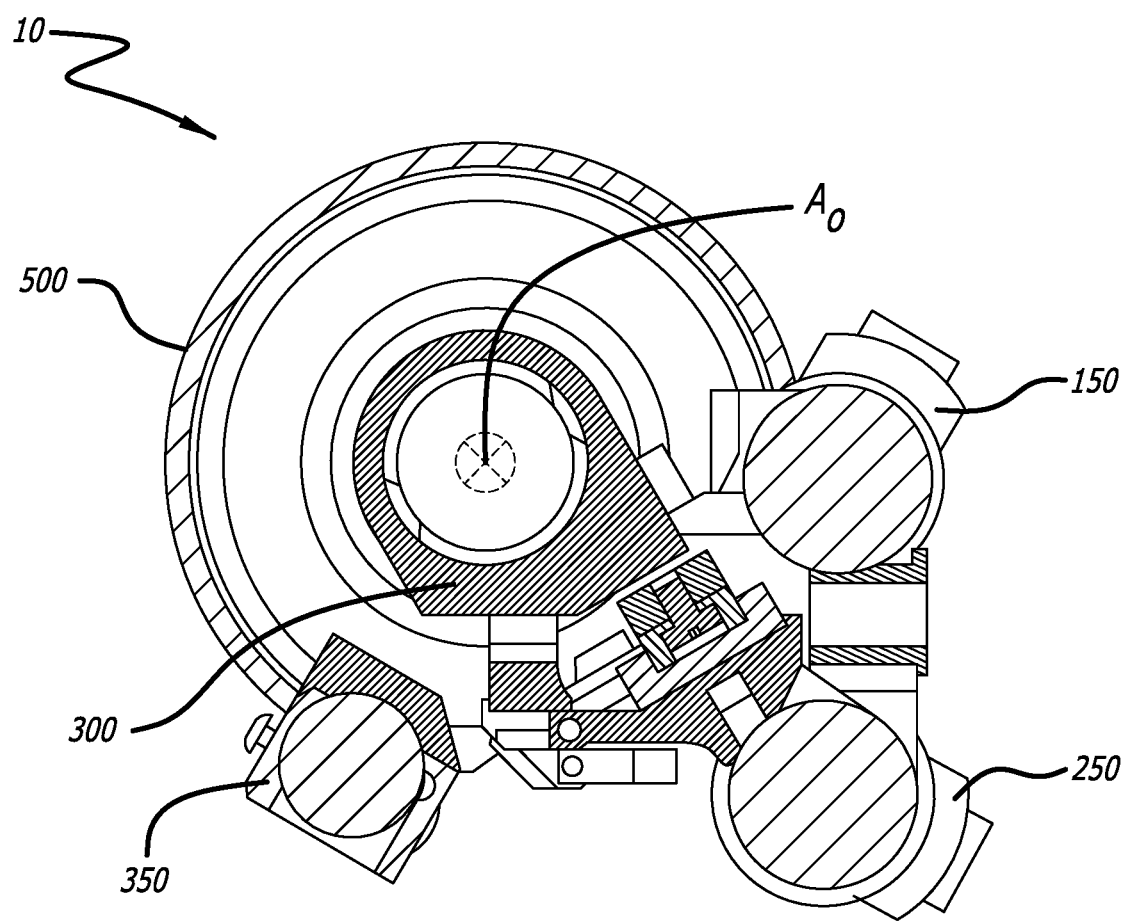
FIG. 11 shows a cross-sectional view of the embodiment of the zoom lens assembly shown in FIG. 1., with mobile lens cell actuators.

FIG. 11 shows a cross-sectional view A-A of the zoom lens assembly 10 taken through the third mobile lens cell 300 (as shown in FIG. 2). In this embodiment, three actuators are provided. A first actuator 150 operative to engage and move the first mobile lens cell 100 through the first range of motion is mounted on the lens support 500. A second actuator 250 operative to engage and move the second mobile lens cell 200 through the second range of motion is also mounted on the lens support 500. A third actuator 350 operative to engage and move the third mobile lens cell 300 through the third range of motion is also mounted on the lens support 500. The actuators 150, 250, and 350 are not shown in FIGS. 1-10 so that the other components of the zoom lens assembly 10 can be shown more clearly. Exemplary actuator types include, without limitation, servo motor actuators, linear actuators, stepper motor actuators, linear motor actuators, piezoelectric actuators, and the like or any combination thereof. Those skilled in the art will appreciate that any type of actuator may be used. In some embodiments, more than one mobile lens cell may be coupled to a single actuator. Those skilled in the art will also appreciate that any number of actuators may be used to position the mobile lens cells in any configuration.

Figure 12:
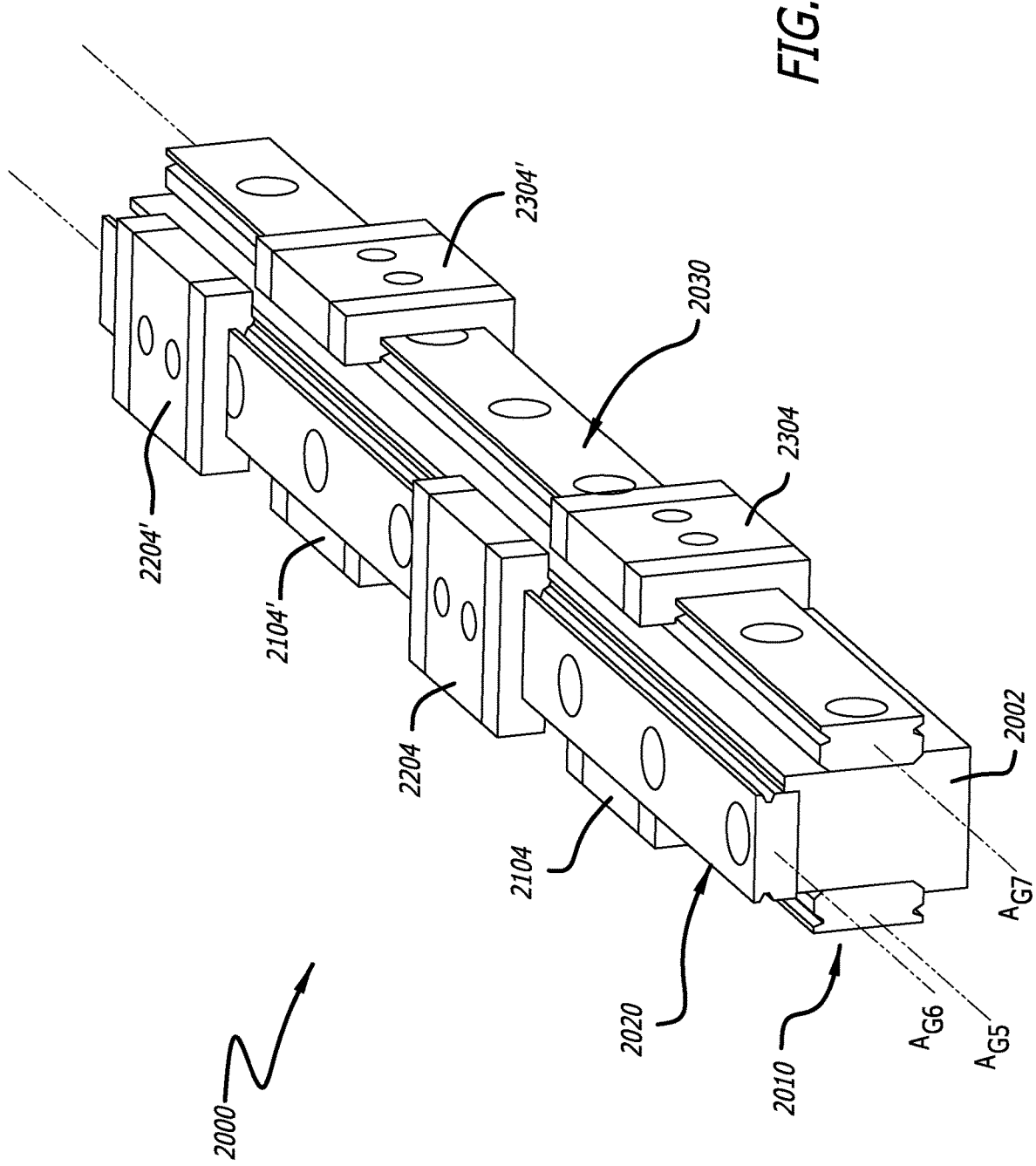
FIG. 12 shows a perspective view of an alternative embodiment of a linear guide assembly.
Figure 13:
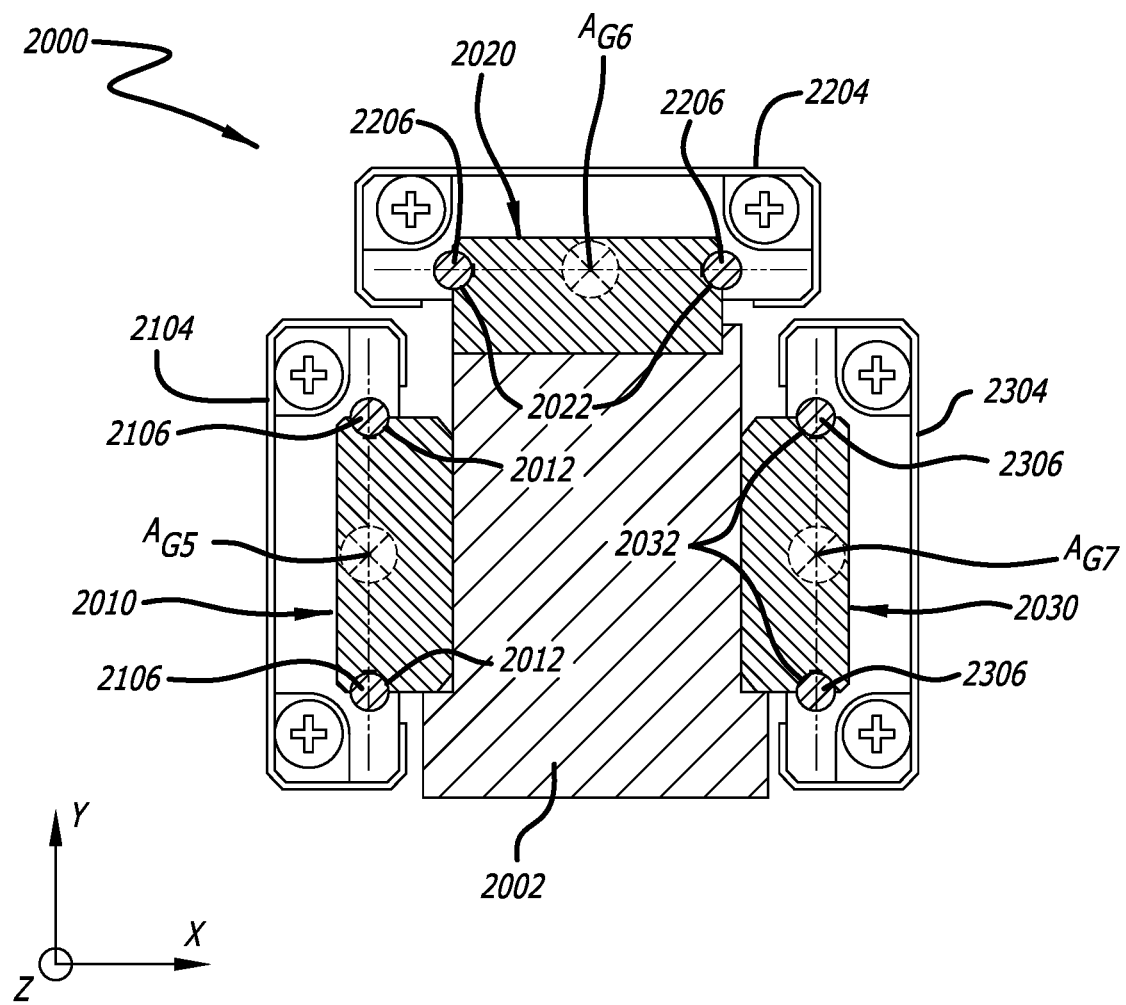
FIG. 13 shows a cross-sectional view of the embodiment of a linear guide assembly shown in FIG. 12.

FIGS. 12 and 13 show views of an embodiment of a linear guide assembly 2000. When configured as described below, the linear guide assembly 2000 may be used in an alternate embodiment of the zoom lens assembly 10 wherein each mobile lens cell is secured to a separate mobile carriage configured to move along the separate guide members through separate ranges of motion. In this embodiment, the linear guide assembly 2000 includes a guide assembly body 2002, with a first guide member 2010 secured to a first surface of the guide assembly body 2002 by a plurality of fasteners (not shown), the first guide member 2010 having a first guide member length and a first guide member axis $A_{G5}$. A second guide member 2020 is secured to a second surface of the guide assembly body 2002 by a plurality of fasteners (not shown), the second guide member 2020 having a second guide member length and a second guide member axis $A_{G6}$. A third guide member 2030 is secured to a third surface of the guide assembly body 2002 by a plurality of fasteners (not shown), the third guide member 2030 having a third guide member length and a third guide member axis $A_{G7}$. As shown in FIG. 12, the linear guide assembly 2000 includes a first mobile carriage 2104 configured to undergo reciprocating motion through a first range of motion along the first guide member 2010 from a first position shown as 2104 to a second position shown as 2104'. The linear guide assembly 2000 further includes a second mobile carriage 2204 configured to undergo reciprocating motion through a second range of motion along the second guide member 2020 from a first position shown as 2204 to a second position shown as 2204'. The linear guide assembly 2000 further includes a third mobile carriage 2304 configured to undergo reciprocating motion through a third range of motion along the third guide member 2030 from a first position shown as 2304 to a second position shown as 2304'.

As shown in FIG. 13, the first guide member 2010 includes a pair of bearing races 2012 formed therein, the bearing races 2012 defining the first guide member axis $A_{G5}$. The second guide member 2020 includes a pair of bearing races 2022 formed therein, the bearing races 2022 defining second guide member axis $A_{G6}$. The third guide member 2030 includes a pair of bearing races 2032 formed therein, the bearing races 2032 defining a third guide member axis $A_{G7}$. The first mobile carriage 2104 includes a plurality of bearings 2106 configured to run along the bearing races 2012. The second mobile carriage 2204 includes a plurality of bearings 2206 configured to run along the bearing races 2022. The third mobile carriage 2304 includes a plurality of bearings 2306 configured to run along the bearing races 2032.

In the illustrated embodiment, the first guide member axis $A_{G5}$, the second guide member axis $A_{G6}$, and the third guide member axis $A_{G7}$ are positioned substantially parallel to each other along their respective lengths. In one embodiment, the first guide member axis $A_{G5}$, the second guide member axis $A_{G6}$, and the third guide member axis $A_{G7}$ are parallel to within less than 1 micron. In another embodiment, the first guide member axis $A_{G5}$, the second guide member axis $A_{G6}$, and the third guide member axis $A_{G7}$ are parallel to within less than 5 microns. In another embodiment, the first guide member axis $A_{G5}$, the second guide member axis $A_{G6}$, and the third guide member axis $A_{G7}$ are parallel to within less than 10 microns. In yet another embodiment, the first guide member axis $A_{G5}$, the second guide member axis $A_{G6}$, and the third guide member axis $A_{G7}$ are parallel to within less than 50 microns. In still another embodiment, the first guide member axis $A_{G5}$, the second guide member axis $A_{G6}$, and the third guide member axis $A_{G7}$ are parallel to within 50 or more microns. When the linear guide assembly 2000 is used in a zoom lens assembly, by virtue of the guide member axes $A_{G5}$, $A_{G6}$, and $A_{G7}$ being parallel to each other within these tolerances, the zoom lens assembly optical axis and the optical axes of any mobile lens may be collinear to within the same tolerances.

In another embodiment, the linear guide assembly 2000 may be configured with a monolithic guide member body (not shown) that includes three guide portions (correlating to the first guide member 2010, the second guide member 2020, and the third guide member 2030) integrated monolithically with the guide assembly body 2002. Each guide portion would have a guide portion axis (correlating to the first guide member axis $A_{G5}$, the second guide member axis $A_{G6}$, and the third guide member axis $A_{G7}$).

The embodiments described above are illustrative of a zoom lens assembly having two static lens groups and three mobile lens cells. Those skilled in the art will appreciate that the guide member and guide portion configurations described above may be expanded to enable zoom lens assemblies having any number of static lens groups and any number of mobile lens cells, without departing from the spirit of the foregoing disclosure.

The foregoing is illustrative of embodiments and examples of the invention, and is not to be construed as limiting thereof. Although a few specific embodiments and examples have been described with reference to the drawings, those skilled in the art will readily appreciate that many modifications to the disclosed embodiments and examples, as well as other embodiments, are possible without materially departing from the novel teachings and advantages of the invention. Accordingly, all such modifications to the subject matter described herein are intended to be included within the scope of the invention as defined in the claims. For example, skilled persons will appreciate that the subject matter of any sentence, paragraph, example or embodiment can be combined with subject matter of some or all of the other sentences, paragraphs, examples or embodiments, except where such combinations are mutually exclusive. The scope of the present invention should, therefore, be determined by the following claims, with equivalents of the claims to be included therein.

What is claimed is:

1. An optical assembly, comprising:
   at least one first guide member having a first guide member length and a first guide member axis;
   a first mobile carriage slidably coupled to the at least one first guide member, the first mobile carriage configured to undergo reciprocating motion along the at least one first guide member within a first range of motion;
   a first mobile lens cell having a first optical axis, the first mobile lens cell secured to the first mobile carriage;
   at least one second guide member having a second guide member length and a second guide member axis wherein the at least one second guide member is coupled to the at least one first guide member;
   a third mobile carriage slidably coupled to the at least one second guide member, the third mobile carriage configured to undergo reciprocating motion along the at least one second guide member within a third range of motion;
   a third mobile lens cell having a third optical axis, the third mobile lens cell secured to the third mobile carriage, wherein the third optical axis and the first optical axis form a subassembly optical axis;
   wherein the first guide member axis and the second guide member axis are substantially parallel; and
   wherein the subassembly optical axis is substantially parallel to the first guide member axis and the second guide member axis.

2. The optical assembly of claim 1, wherein at least one of the first static lens group, the second static lens group, the first mobile lens cell, and the third mobile lens cell includes optical elements selected from the group consisting of convex-convex lenses, convex-concave lenses, concave-concave lenses, plano-convex lenses, plano-concave lenses, aspherical lenses, dual aspherical lenses, freeform lenses, off-axis parabolic lenses, specially truncated lenses, telecentric lenses, doublets, triplets, filters, mirrors, prisms, gratings, diffractive optical elements, and waveplates.

3. The optical assembly of claim 1, further comprising:
   a second mobile carriage slidably coupled to the at least one first guide member, the second mobile carriage configured to undergo reciprocating motion along the at least one first guide member to within a second range of motion;
   a second mobile lens cell having a second optical axis, the second mobile lens cell secured to the second mobile carriage; and
   wherein the second optical axis is substantially collinear with the subassembly optical axis, and is substantially parallel to the first guide member axis and the second guide member axis.

4. The optical assembly of claim 3, wherein the second mobile lens cell includes optical elements selected from the group consisting of convex-convex lenses, convex-concave lenses, concave-concave lenses, plano-convex lenses, plano-concave lenses, aspherical lenses, dual aspherical lenses, freeform lenses, off-axis parabolic lenses, specially truncated lenses, telecentric lenses, doublets, triplets, filters, mirrors, prisms, gratings, diffractive optical elements, and waveplates.

5. The optical assembly of claim 1, wherein the first guide member axis and the second guide member axis are parallel to within less than 1 micron over the first guide member length.

6. The optical assembly of claim 1, wherein the first guide member axis and the second guide member axis are parallel to within less than 5 microns over the first guide member length.

7. The optical assembly of claim 1, wherein the first guide member axis and the second guide member axis are parallel to within less than 10 microns over the first guide member length.

8. The optical assembly of claim 1, wherein the first guide member axis and the second guide member axis are parallel to within less than 50 microns over the first guide member length.

9. The optical assembly of claim 1, wherein the subassembly optical axis is parallel to the first guide member axis within less than 1 micron over the first guide member length.

10. The optical assembly of claim 1, wherein the subassembly optical axis is parallel to the first guide member axis to within less than 5 microns over the first guide member length.

11. The optical assembly of claim 1, wherein the subassembly optical axis is parallel to the first guide member axis to within less than 10 microns over the first guide member length.

12. The optical assembly of claim 1, wherein the subassembly optical axis is parallel to the first guide member axis to within less than 50 microns over the first guide member length.

13. The optical assembly of claim 3, wherein the second optical axis is collinear with the subassembly optical axis to within less than 1 micron over the first guide member length.

14. The optical assembly of claim 3, wherein the second optical axis is collinear with the subassembly optical axis to within less than 5 microns over the first guide member length.

15. The optical assembly of claim 3, wherein the second optical axis is collinear with the subassembly optical axis to within less than 10 microns over the first guide member length.

16. The optical assembly of claim 3, wherein the second optical axis is collinear with the subassembly optical axis to within less than 50 microns over the first guide member length.

17. A lens assembly, comprising:
a lens support having a first end and a second end;
a first static lens group secured to the first end of the lens support;
a second static lens group secured to the second end of the lens support, wherein the first static lens group and the second static lens group together define an assembly optical axis;
at least one first guide member secured to the lens support, the at least one first guide member having a first guide member length and a first guide member axis;
a first mobile carriage configured to undergo reciprocating motion along the at least one first guide member within a first range of motion;
a first mobile lens cell having a first optical axis, the first mobile lens cell secured to the first mobile carriage;
a second guide member having a second guide member length and a second guide member axis is secured to the at least one first guide member;
a third mobile carriage configured to undergo reciprocating motion along the second guide member within a third range of motion;
a third mobile lens cell having a third optical axis, the third mobile lens cell secured to the third mobile carriage;
wherein the first guide member axis and the second guide member axis are substantially parallel;
wherein at least one of the first optical axis and the third optical axis is substantially collinear with the assembly optical axis; and
wherein the assembly optical axis is substantially parallel to the first guide member axis and the second guide member axis.

18. The lens assembly of claim 17, wherein at least one of the first static lens group, the second static lens group, the first mobile lens cell, and the third mobile lens cell include optical elements selected from the group consisting of convex-convex lenses, convex-concave lenses, concave-concave lenses, plano-convex lenses, plano-concave lenses, aspherical lenses, dual aspherical lenses, freeform lenses, off-axis parabolic lenses, specially truncated lenses, telecentric lenses, doublets, triplets, filters, mirrors, prisms, gratings, diffractive optical elements, and waveplates.

19. The lens assembly of claim 17, further comprising a second mobile carriage configured to undergo reciprocating motion along the at least one first guide member within a second range of motion; and
a second mobile lens cell having a second optical axis, the second mobile lens cell secured to the second mobile carriage.

20. The lens assembly of claim 17, wherein the lens assembly is a zoom lens.

21. The lens assembly of claim 17, further comprising:
a first actuator coupled to the lens support and the first mobile lens cell, the first actuator operative to engage and move the first mobile lens cell in reciprocating motion along the at least one first guide member within the first range of motion; and
a third actuator coupled to the lens support and the third mobile lens cell, the third actuator operative to engage and move the third mobile lens cell in reciprocating motion along the second guide member within the third range of motion.

22. The lens assembly of claim 19, further comprising a second actuator coupled to the lens support and the second mobile lens cell, the second actuator operative to engage and move the second mobile lens cell in reciprocating motion along the at least one first guide member within the second range of motion.

23. The lens assembly of claim 21, wherein at least one of the first actuator and the third actuator are selected from the group consisting of servo motor actuators, linear actuators, stepper motor actuators, linear motor actuators, and piezoelectric actuators.

24. The lens assembly of claim 22, wherein the second actuator is selected from the group consisting of servo motor actuators, linear actuators, stepper motor actuators, linear motor actuators, and piezoelectric actuators.

25. The lens assembly of claim 17, wherein at least one of the first optical axis and the third optical axis are collinear with the assembly optical axis to within less than 1 micron through the first range of motion.

26. The lens assembly of claim 17, wherein at least one of the first optical axis and the third optical axis are collinear with the assembly optical axis to within less than 5 microns through the first range of motion.

27. The lens assembly of claim 17, wherein at least one of the first optical axis and the third optical axis are collinear with the assembly optical axis to within less than 10 microns through the first range of motion.

28. The lens assembly of claim 17, wherein at least one of the first optical axis and the third optical axis are collinear with the assembly optical axis to within less than 50 microns through the first range of motion.

29. The lens assembly of claim 19, wherein the second optical axis is collinear with the assembly optical axis to within less than 1 micron through the second range of motion.

30. The lens assembly of claim 19, wherein the second optical axis is collinear with the assembly optical axis to within less than 5 microns through the second range of motion.

31. The lens assembly of claim 19, wherein the second optical axis is collinear with the assembly optical axis to within less than 10 microns through the second range of motion.

32. The lens assembly of claim 19, wherein the second optical axis is collinear with the assembly optical axis to within less than 50 microns through the second range of motion.

33. The lens assembly of claim 17, wherein the first guide member axis and the second guide member axis are parallel to within less than 1 micron over the first guide member length.

34. The lens assembly of claim 17, wherein the first guide member axis and the second guide member axis are parallel to within less than 5 microns over the first guide member length.

35. The lens assembly of claim 17, wherein the first guide member axis and the second guide member axis are parallel to within less than 10 microns over the first guide member length.

36. The lens assembly of claim 17, wherein the first guide member axis and the second guide member axis are parallel to within less than 50 microns over the first guide member length.

37. A linear guide apparatus, comprising:
   at least one first guide member having a first guide member length and a first guide member axis;
   at least one second guide member having a second guide member length and a second guide member axis;
   one or more fastening members configured to secure the at least one first guide member to the at least one second guide member so that the first guide member axis and the second guide member axis are substantially parallel through the first guide member length;
   a first mobile carriage slidably coupled to the at least one first guide member and configured to undergo reciprocating motion along the at least one first guide member within a first range of motion; and
   a third mobile carriage slidably coupled to the at least one second guide member and configured to undergo reciprocating motion along the at least one second guide member within a third range of motion.

38. The linear guide apparatus of claim 37, further comprising a second mobile carriage slidably coupled to the at least one first guide member and configured to undergo reciprocating motion along the at least one first guide member within a second range of motion.

39. The linear guide apparatus of claim 37, wherein the first guide member axis and the second guide member axis are parallel to within less than 1 micron over the second guide member length.

40. The linear guide apparatus of claim 37, wherein the first guide member axis and the second guide member axis are parallel to within less than 5 microns over the second guide member length.

41. The linear guide apparatus of claim 37, wherein the first guide member axis and the second guide member axis are parallel to within less than 10 microns over the second guide member length.

42. The linear guide apparatus of claim 37, wherein the first guide member axis and the second guide member axis are parallel to within less than 50 microns over the second guide member length.

43. A guide member, comprising:
   a monolithic guide member body;
   a first guide portion formed in the monolithic guide member body, the first guide portion having a first guide portion length and a first guide portion axis;
   a second guide portion formed in the monolithic guide member body having a second guide portion length and a second guide portion axis; and
   wherein the first guide portion axis and the second guide portion axis are substantially parallel over the first guide portion length.

44. The guide member of claim 43, wherein the first guide portion axis and the second guide portion axis are parallel to within less than 1 micron over the first guide portion length.

45. The guide member of claim 43, wherein the first guide portion axis and the second guide portion axis are parallel to within less than 5 microns over the first guide portion length.

46. The guide member of claim 43, wherein the first guide portion axis and the second guide portion axis are parallel to within less than 10 microns over the first guide portion length.

47. The guide member of claim 43, wherein the first guide portion axis and the second guide portion axis are parallel to within less than 50 microns over the first guide portion length.

* * * * *